(12) United States Patent
Lavine et al.

(10) Patent No.: US 8,855,334 B1
(45) Date of Patent: Oct. 7, 2014

(54) MIXED CONTENT FOR A COMMUNICATIONS DEVICE

(75) Inventors: Adam Lavine, Livermore, CA (US); Yu-Jen Dennis Chen, Livermore, CA (US); Daniel Marius Lyon, San Francisco, CA (US)

(73) Assignee: Funmobility, Inc., Pleasanton, CA (US)

( * ) Notice: Subject to any disclaimer, the term of this patent is extended or adjusted under 35 U.S.C. 154(b) by 931 days.

(21) Appl. No.: 12/785,199

(22) Filed: May 21, 2010

Related U.S. Application Data (60) Provisional application No. 61/180,328, filed on May 21, 2009.

(51) Int. Cl.
   *H04B 1/00* (2006.01)
   *G06F 17/00* (2006.01)

(52) U.S. Cl.
   USPC ............................................. 381/119; 700/94

(58) Field of Classification Search
   CPC .. G10H 1/366; G10H 1/368; G10H 2210/066
   USPC ...................... 381/10, 14, 119; 455/414, 418; 705/14.64, 14
   See application file for complete search history.

(56) References Cited

U.S. PATENT DOCUMENTS

| | | | |
|---|---|---|---|
| 2002/0009201 A1 * | 1/2002 | Beard | 381/23 |
| 2006/0165240 A1 * | 7/2006 | Bloom et al. | 381/56 |
| 2008/0214148 A1 * | 9/2008 | Ramer et al. | 455/414.1 |
| 2009/0094095 A1 * | 4/2009 | Slaney et al. | 705/10 |
| 2009/0240568 A1 * | 9/2009 | Ramer et al. | 705/10 |
| 2011/0103618 A1 * | 5/2011 | Lemellat et al. | 381/119 |

* cited by examiner

*Primary Examiner* — Fan Tsang
*Assistant Examiner* — Eugene Zhao
(74) *Attorney, Agent, or Firm* — Maschoff Brennan (57) ABSTRACT

A method for providing a user with mixed content for a device. The method includes pre-rendering mixed content comprising a mix of a first source track and a second source track identified as being compatible with the first source track. The pre-rendered content is stored in a database. Upon receiving a user request which identifies the first source track as a track to be included in the mixed content for a device, the system retrieves a list of second source tracks having characteristics compatible with the first source track and provides the list to the user. Then, the system receives request identifying the second source track as a track to be included in the mixed content along with the first track. In response, the system retrieves the pre-rendered mixed content from the database and sends the pre-rendered mixed content to the device.

18 Claims, 7 Drawing Sheets

MIXED CONTENT FOR A COMMUNICATIONS DEVICE

CROSS-REFERENCE TO RELATED APPLICATIONS

This application claims the benefit of U.S. Provisional Application Ser. No. 61/180,328 filed May 21, 2009 and entitled MIXED CONTENT FOR A COMMUNICATIONS DEVICE, which application is incorporated by reference in its entirety.

BACKGROUND OF THE INVENTION

1. The Field of the Invention

The invention generally relates to creating customized content for wireless devices. More specifically, embodiments of the invention relate to systems and methods for providing a user with a customized ringtone for a mobile telephone which includes a mix of multiple musical tracks selected by the user.

2. The Relevant Technology

In relatively few years, cellular telephones have gone from being rare, expensive pieces of equipment used mainly by businesses to inexpensive, commonly owned personal devices. Cellular telephones have become an integral part of people's lives, and have even replaced the use of traditional land-line telephones in many homes throughout the world.

Along with the growth in use and popularity of cellular phones, a mobile culture has evolved and cellular phones are now widely used as social tools. Friends stay in touch using personalized phone address books, messaging features including text based messaging, and email retrieval. The phone itself has become its own fashion object, with users personalizing, decorating, and customizing their phones to reflect their own personality or for other reasons.

Currently, users have several options to customize their phones. Decorative covers are widely available and can be easily changed. Cellular phones also offer users the ability to create custom settings. For example, many phones contain a memory bound listing of different ringtone selections, typically consisting of popular tunes, classical scores, or traditional telephone rings. While this listing generally offers a cellular phone user a degree of customization, the personalization is often limited to the number of selections preloaded in memory.

As users have sought additional ringtone choices beyond those available in the default phone settings, several options have become available. One option permits a user to download a desired ringtone from a large selection or ringtones, typically available via the Internet. Generally, the user selects a previously created ringtone from a listing of available tones, often pays a fee for access to the new ringtone, and finally receives a message which contains or enables access to the ringtone of choice. One problem with this configuration, however, is that the selection is limited and lacks the customized or personalized experience that many users desire.

Thus, despite various advances in the field, users are generally still limited to selecting a single ringtone from a pre-fabricated library of ringtones. Generally, these ringtones are created according to selections or parameters created by someone other than the user and prevent the user from participating in the creative decisions regarding the musical composition of the ringtone. Thus, there is a need for an efficient ringtone service which allows the users the option of making more customized ringtones.

BRIEF DESCRIPTION OF THE DRAWINGS

To further clarify at least some of the advantages and features of embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to systems and methods for creating customized content including customized ringtones that can be played on a device such as a cellular telephone. Embodiments of the invention enable users to select two or more source tracks which may be mixed together (aka "mashed up") in order to generate customized content which may be delivered to the user's device. A user has the ability to preview the source tracks to identify tracks which the user would like to be included in a mixed content that is capable of being played on the user's device. The customized content may be referred to herein as "a mashup" or alternatively as customized content or mixed content, A mashup can include a ringtone, a ringback tone, or other content or file that can be played or rendered on a device. Embodiments of the invention thus relate to the generation of customized content including ringtones, ringback tones, or other files (including audio and/or video and/or text or other type of content including tactile content) that can be played and/or rendered by a device (e.g., cellular telephone, smartphone, tablet, laptop, desktop).

In some embodiments, the customized content is often rendered in the context of another action. For example, a ringtone or ringback tone often occurs in the context of a telephone call. Customized content may also occur in the context of sending and/or receiving a text or media message. More generally, embodiments discussed herein further relate to customized content that can be played in the context of texting or other messaging applications (SMS, image messaging, email, video messaging, voice messaging, and the like or any combination thereof). In addition, embodiments of the invention are not limited to wireless devices, but can also occur with other computing devices such as desktop computers or other network connected devices that may use alternate communication schemes including voice over IP.

Figure 1A:
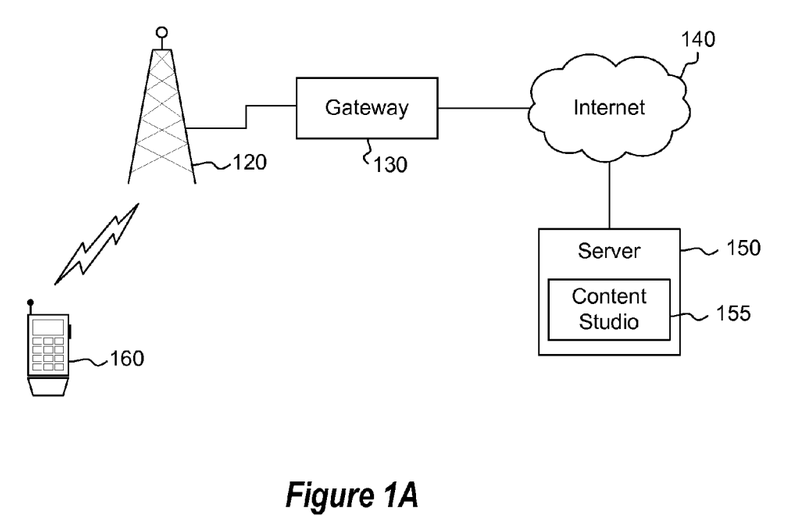
FIG. 1A illustrates an exemplary environment for implementing embodiments of the invention.

FIG. 1A illustrates an exemplary environment for implementing embodiments of the invention. FIG. 1A illustrates a device 160 which communicates with a remote server 150 to access a content studio 155. The content studio 155 enables a user of the device 160 to make selections in order to request content that can then be delivered to the device 160. The content provided by the content studio 155, for example, may include content from which a ringtone is selected and/or generated. More generally, the content studio 155 stores the content from which the mashups are generated.

The content studio 155 and/or server 150 may refer to multiple servers. For example, a portion of the content studio 155 may be involved in pre-production aspects of delivering customized content. This may include processing the source tracks to extract or separate vocals from instrumentals, preparing the tracks for combining in terms of tempo, pitch, volume, length, etc., combining track to pre-render mashups, generating multiple formats or versions of each mashup, and/or storing the mashups in a mashup library. The content studio 155 may also be involved in delivering the mashups to users. In this cast, the content studio may be accessible to users over a network, provide user interfaces to enable user input, and deliver selected mashups to the user's devices. One of skill in the art can appreciate that these aspects of the content studio 155 can be implemented on the same server or on different servers. In one embodiment, the pre-production aspects are implemented on one server or one group of servers and the deliver aspects are implemented on another server or group of servers. The servers used to perform the pre-production, for instance, may not be available to the public over the Internet.

In some instances, user's selections can be anticipated or controlled and mashups can be generated in advance. As described in more detail below, the mashups are typically generated prior to receiving input from a user. As a result, the selections made by the user are used to retrieve a mashup from a library of mashups that have already been generated. This can improve the speed with which mashups are delivered to end users. The content studio 155 may also store metadata (such as an index) that is used to track various aspects about the content and/or the mashups generated therefrom. The metadata may also serve as a library to track the rights to the content being used to generate the mashups or customized content.

The following discussion may include specific references to specific types of customized content or mashups such as ringtones or ringback tones. One of skill in the art, with the benefit of the present disclosure, can appreciate that the following discussion applies to customized content or mashups as referenced herein.

Embodiments of the invention enable content in the content studio 155 to be pre-rendered in a variety of different mixed ringtones of various combinations so that the content studio 155 may quickly provide the user with the requested ringtone without requiring additional processing time while the requested ringtone is generated. Thus, selections provided by a user are used to identify a pre-rendered mixed ringtone by the server 150. The requested mixed content is delivered to the device 160 where it may be played, for example as a ringtone.

In FIG. 1A, the device 160 may be a cellular telephone, a personal digital assistant, a laptop computer, or any other device that can access the server 150 over a network. In this example, the device 160 is in wireless communication with a tower 106 that communicates to a gateway 130. The gateway 130 serves as a bridge between the protocols of the wireless network in which the device 160 operates and other networks such as the Internet 140. The gateway 130 thus converts a transmission in one domain to another or from one protocol to another. Of course, the communication between the server 150 and the device 160 may occur over other networks or network configurations. For instance, the gateway 130 may not be included when the device 160 accesses the server 150 over the Internet using a WiFi connection, for example.

In this example, the device 160 is transmitting over a wireless network using protocols that are common to cellular telephones. The gateway 130 receives the transmission from the device 160 and forwards the transmission over the Internet 140 to the server 150 using the appropriate Internet protocol. Similarly, the gateway 130 converts data transmitted over the Internet 140 from the server 150 into the appropriate wireless protocol for transmission to the device 160. In this example, the device 160 can request and receive content such as ringtones from the content studio 155 of the server 150.

The content studio 155 includes, in one embodiment, computer executable modules or code that generate content for a user based on various factors or considerations in addition to content such as media files. When generating a ringtone, for example, the content studio 155 may prompt a user for input that relates to the tracks used in a ringtone. Alternatively, the content studio 155 may be able to identify certain tracks based on information already known or previously provided by the user. Thus, the user preferences may be inputted through a user interface, discovering by analyzing a user library, inferred from previous user selections, or may be stored in a database. The server 150 then generates or retrieves the customized content and delivers the customized content to the device 160.

Figure 1B:
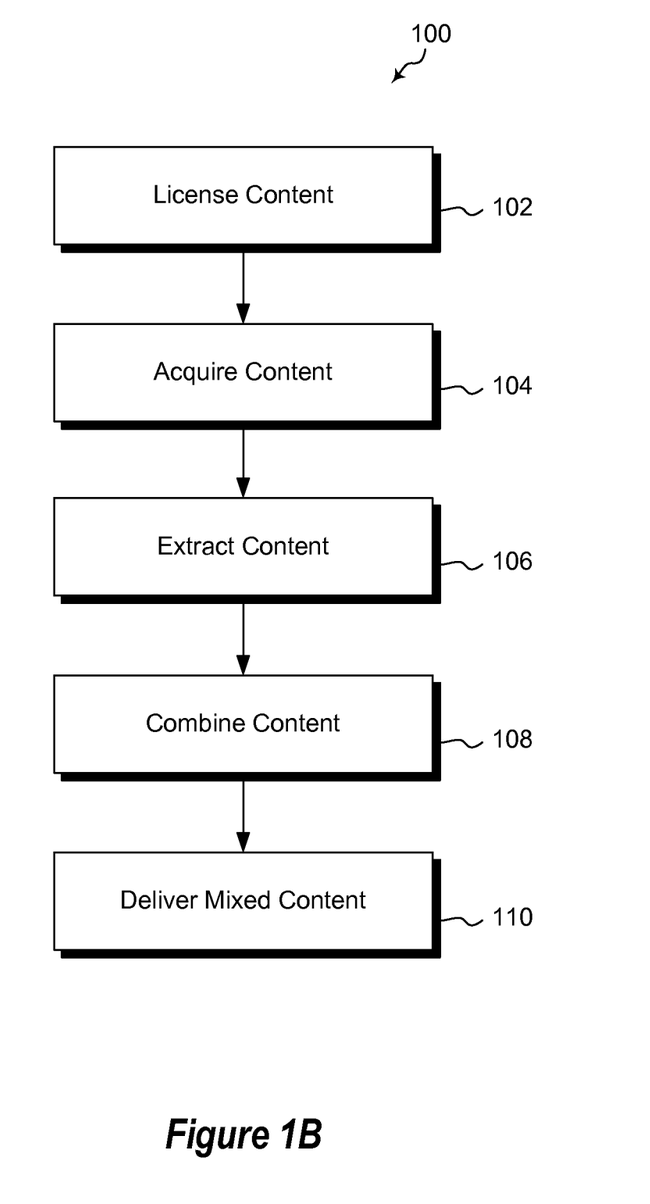
FIG. 1B shows an illustrative embodiment of a method for generating customized content.

FIG. 1B shows one example of a method 100 for generating customized content. FIG. 1B includes aspects of delivering customized content relating to content pre-production (e.g., licensing the content, preparing the content to be included in mashups, and generating mashups to be included in the content studio 155). The server 150 may or may not be involved in these aspects. In some instances, the pre-production aspects of delivering customized content may result in the mashups that are stored in the content studio 155. Thus, the server 150 may be involved in enabling a user to select or purchase a mashup and in delivering the mashup to the user's device while another server of aspect of the content studio 155 may be involved in performed pre-production on the source content.

The method 100 may begin by licensing 102 content. However, the method may also begin with content that has already been licensed and prepared as described herein. Thus, the generation of customized content may includes methods that use licensed and/or otherwise available content.

Because the customized content may be a ringtone, the content being licensed may include music and/or compositions that can be included (partially and/or wholly) in the ringtone. Because the music and/or compositions are often owned by another party, it may be necessary to obtain the appropriate rights. Licensing 102 content may include reviewing and identifying titles (an example of content) to be included in a library of content or in a content studio as well as the rights to use those titles as necessary. The rights may include master rights, publishing rights, and the like or any combination thereof. The rights to the masters can be negotiated from the holders or owners of the titles. Often, music labels are a good choice for licensing master recordings. In instances where the rights to the master recordings cannot be obtained, covertone and "sound-alike" providers may be used. Where necessary, the appropriate licenses are obtained. Licensing content may also include the generation of a framework for the various terms included in the licensing agreement. Once the framework for the terms of the various rights is developed, publishing research for the desired titles or compositions that may be included in the various ringtones (or other content) is started.

Researching the publishing rights can be performed using online databases. The following databases are identified by way of example only and not limitation:

http://www.ascap.com/ace/search.cfm?mode=search http://repertoire.bmi.com/DisclaimerNew.asp?URL=/index.asp?

http://www.sesac.com/repertory/sRepertorySQL.asp http://www.harryfox.com/songfile/public/public-search.jsp: Harry Fox handles mechanical licensing for publishers as well. However, they should only be considered a reference; not a 100% accurate result.

http://www.copyright.gov/records/: Certain compositions might also be registered with the US. Copyright Office. They have a searchable database.

Lastly, individual music publishers may have searchable databases on their websites:

http://www.emimusicpub.com/worldwide/index.html http://www.warnerchappell.com/wcm_2/home2.jsp Researching the publishing rights using online databases (often provided by performing rights agencies or large publishers) enables the writers to be identified and enables splits to be determined from the publishers. In some instances, the publishing research can be performed by a third party. When performed by a third party, the content (e.g., songs, artists, and/or titles) are typically identified. A third party licensing agent may also be used. Licensing agents often provide research and general project management services.

Licensing content may also include additional elements that may be performed when the content is licensed and/or after the content has been licensed. These actions are often performed because the licenses on content can change. For example, a license may be changed, expire, be extended, be cancelled, be re-negotiated, etc.

Licensing Status.

When a request has been made, a series of processes are performed to verify that only content with the proper usage rights is allowed to populate the content management system or the content studio 155. The licensing status process determines if the content has already been cleared for use, or whether an agreement (e.g., a Content Clearance Agreement or Indemnification Agreement) is still needed.

Content Licensing Status Determination. If an existing license that covers the rights requested for certain content is not in place, such as when the license has expired, a determination is made by the original requester whether to begin the process to obtain the necessary rights or to cancel the original request for the rights to the content. If a license that covers the rights to certain content requested is not active, or an existing license does not cover the rights requested, attempts may be made to obtain the necessary rights.

New Content Process.

Content that is not covered by an existing license (e.g., a Content Clearance Agreement) can be added to the system (e.g., the content studio) when either indemnification is obtained from the client (e.g. the carrier) or an appropriate license is obtained from the licensor.

Client Indemnification.

Clients who have the proper content clearances from the content licensor are often asked to provide a letter of indemnification that protects certain parties (e.g., a provider of the content studio) from any legal action that might arise out of the use of content as disclosed herein. The indemnification letter received may cover just the particular contents, or may be a blanket indemnification that covers all content associated with the client or licensor. Content covered by an indemnification may not require a licensing agreement.

Offer to Negotiate.

Once a determination has been made to attempt to obtain the content rights, an offer to negotiate is made to the content licensor. Non-Disclosure Agreements (NDA's) are signed as required.

Negotiate Content Clearance.

If the licensor accepts the offer to negotiate, a new term sheet is assembled. Alternatively, an existing license agreement may be modified. The new term sheet or license may include one or more of (by way of example only):

Royalty Rates;

Reporting Requirements;

Grant of Rights Details;

Audit Provisions; and/or

Representations & Warranties.

A license is negotiated with the content owner (with applicable oversight from finance and legal). If acceptable terms are determined, the license typically undergoes a review and approval process. If acceptable terms are not arrived at, the licensing effort is terminated and the original requester notified.

Content Agreement Management Review (License Review).

Once acceptable terms have been agreed to, the agreement is sent for approval. Approvals are recorded.

Rights Management Tracking.

Rights Management Tracking involves preparing an agreement for processing and tracking. Once an approved agreement is obtained, the agreement is entered into the filing system by system. Licensing creates a license holder (or Artist) for the content in the platforms, and notifies Finance of the royalty rate and client status. Licensing also populates the Licensing Matrix with content license information. "file01/contracts" stores Content Licensing Agreements in PDF format to allow for easy retrieval of a specific agreement; and is a repository for all correspondence related to a license.

Content Production Requests.

After the license has received final approval, and the rights management details have been entered, the original requester is notified of the status of the license. The requester creates the necessary request to populate the content platform (e.g, the content studio) with the required content. Production requests are sent to for the creation of the content to be placed in the content studio.

Rights Management Updates.

Rights management updates are performed when the rights are revised. Notifications of changes in the status of content rights are made by the licensor and/or licensee and/or other party. The steps taken to update the license may depend on the change being made.

Change in Content Ownership or Royalty.

When content ownership terms or a change of ownership occurs Update the content management system/licensing matrix, which may be included in the content studio 155, to reflect the new terms and/or owner contact information.

Change in Content Use Rights.

The content management system/licensing matrix is updated to reflect, by way of example only, the new rights, which may include territories, product types (e.g., ringtone, ringback), time period, or the like.

Performance Attributes Update.

The metadata associated with the licensed content can be updated. For instance, the metadata associated with the content may include number of times purchased, number of times previewed, number of times viewed, mixed, or the like.

When the change in use rights requires the content to be removed from the platform and/or third party partner systems, the content takedown requests are reviewed for applicability. The request to remove is then executed and third parties are also notified as well.

After licensing 102 the content, the content is acquired 104. This typically entails acquiring the content from the music labels, indie labels or other licensor (e.g., cover tone providers, celebrity voice tone provider). The content is typically acquired or converted to a particular format. The content may be received, by way of example, as stems or multi-tracks. Stems or multi-tracks facilitate manipulation of the content and often include separate recordings of multiple sound sources to create a cohesive whole.

The content may be a combination of full-track and instrumental recordings. The combination of these components allows the vocal track to be removed and isolated from the stereo track recording. The content may also be received as a full-track recording.

After acquiring 104 the content, the content is extracted 106. Extracting the content includes pre-producing the content for use in the content studio 155. Preproduction and extraction may include one or more of the followings elements, which may be performed iteratively and/or in various orders. Extraction prepares the content such that a user can create their own version of content as disclosed herein. This may include isolating the vocal track or aspect of the content, separating specific instruments or the non-vocal portion, preparing the content to be mixed or concatenated with other content, or the like.

For example, vocal tracks may be removed and/or isolated from mixed stereo track recordings. Vocal tracks can be removed, for example, using phase cancellation and/or isolation of center channel. Phase cancellation of an instrumental mix can also isolate vocals. Frequency ranges unoccupied by vocals can also be filtered out. Typically, isolation of the vocal track or channel is performed when the source files are not delivered is stem format or in an a capella format.

These processes are described in more detail as follows. Vocal track removal and isolation from mixed stereo track recordings can be successful, but may depend on how the original track was mixed. Variables such as pan positioning, delay, reverb and track fidelity impact how effective the extraction of the content will be. Embodiments isolate the vocal track as much as possible, but some background artifacts may remain. In addition, the isolation is often performed without affecting the vocals to the extent possible. After combining the extracted vocal with a new track, the remaining artifacts in the isolated vocals can be drowned out by the new instrumentation.

Lossy audio compression (mp3, m4a, etc.) can reduce the effectiveness of the techniques bellow. To avoid this problem, it is better to use a lossless audio format (FLAC, WAV, etc.). Below is a description of the various techniques used to extract and isolate vocal tracks from mixed stereo track recordings. These techniques can be mixed and matched if needed for better results.

Phase Cancellation of Center Channel (Remove Vocals).

This technique will remove everything that is panned to the center of the stereo field. This typically only work with stereo tracks. In some recordings, voice and bass are mixed dead center (low frequency sounds are perceived as non-directional so that's why bass is usually panned center). By using this technique, what is common in the mix between the left and right channels can be subtracted. This results in a stereo track with the center channel taken out. Everything that is panned left and right of center will remain. It is possible to add certain frequency ranges back to the mix (bass for instance) with EQ and filters. To do so, take the left channel and boost the gain on the frequency range you want to keep and then subtract the same amount on the right channel. (e.g., set the 90 Hz left channel to +8 dB and the 90 Hz right channel to −8 dB). When subtracting what is common between the two channels, the affected frequency range will now remain in the mix because the frequency range is different in both channels. When listening, it will sound unaffected because the boosted frequencies on the left channel are offset by the attenuation on the right channel. This technique can be achieved in any multi-track audio recording program in one of two ways, by way of example only:

Method 1:
Import stereo file and split the track in two (left and right channel).
Place each audio file on a different track and pan to center.
Line up the tracks to the same start position.
Select one of the tracks and apply a "phase invert" effect (this will extract the center channel, and combine the rest into a single mono file).
Export the results as a mono file.

Method 2:
Import stereo file and split the track in two (left and right channel).
Place each audio file on a different track and pan hard left and right.
Copy the two audio files to two additional tracks and pan both center.
Line up all the tracks so they have the same start positions.
Select both track that are panned center and apply the "phase invert" effect from the effects/audio processing menu. (This will subtract the center channel, and keep the rest of the stereo field intact)
Export the results as a stereo file.

Phase Cancellation and Isolation of center Channel (vocal isolation).

This technique is used typically when the vocals are panned to the center channel. In order to isolate the center channel and remove everything that is panned left and right of center we have to first remove the vocals using the technique above (Method 2 is preferred so you can be left with an audio file that keeps the stereo field in tact). Once you have a stereo file with the center track removed, the results are phase inverted and add to the original full mix. This will subtract the left and right channels and leave the center track intact. This technique may not keep time-based audio effects applied to the vocal track.

To achieve this in a multi-track recorder:
Import exported file from Method 2 and pan left and right.
Import the original full mix file and pan left and right.
Line up all the tracks to the same start position.
Select the "method 2" tracks and apply the "phase invert" effect from the effects/audio processing menu. (this will extract the left and right channel from the original full mix and leave the center channel)

Phase Cancellation of Instrumental Mix (Vocal Isolation).

In this method of extracting vocals, all the music tracks are cancelled from the full mix. This often used both an instrumental mix and a full mix of the content. With these two copies, they can be lined up in a multi-track recorder and the instrumental mix can be inverted. This will make all of the negative values positive and all the positive values negative. When lined up with the original mix everything present in the instrumental mix is cancelled out in the full mix (a positive value minus an equal negative value equals zero). Only the vocals remain, regardless of where they are panned in the stereo field. This technique will also keep all vocal effects in tact (reverb, stereo delays, flangers, etc.)

The instrumental mixes must be exactly the same in both audio files for this to work effectively. If the balance is different in either one of the mixes, the cancellation will not work as well. If the tracks are out of phase or mixed differently, certain frequency ranges and sections will cancel out and others will not. Moving the tracks around slightly can help line up certain sections and cancel out the instrumental tracks. Additional EQ filtering can help out as well (see next section).

Filtering Out Frequency Ranges Unoccupied by the Vocals.

Another technique used to remove background instrumental tracks from a fully mixed stereo recording is through the use of EQ and filtering. Using an audio editing program, certain frequency bands unoccupied by the vocals can be filtered out. There are several ways to which unwanted frequencies can be filtered. The first way is by using a high and low pass filters. A frequency point can be selected and everything outside the vocal frequency range can be attenuated by using these filters (Use a high pass filter to cut the lower frequencies and a low pass filter to cut off the higher frequencies)

Another filtering technique involves the use of noise reduction software. It is often best to start with an audio file that already has already had most of the backing instrumental tracks removed. Start with an isolated center channel that has had the lower and higher frequencies filtered out. Find a section of the track that has no vocals (a pause in between two vocal phrases) and capture a noise profile using the noise reduction software. Select the file and apply the noise reduction. Adjust the frequency profile where needed to make sure none of the vocals are taken out.

Unwanted sounds can also be filtered using spectral analysis. By analyzing the spectral profile, non-fundamental harmonics can be identified. By identifying these harmonics, a frequency dependent gate can be set up to remove prominent transients such as cymbals and snare drum hits. A fast attack may be used in order to ensure that the gate "ducks" these transients.

After the content is extracted and/or pre-produced, the content is combined 108 or mixed. This aspect combines/mixes the audio elements back together again. More specifically, a mashup is a seamless (or substantially seamless—i.e., not noticeable to a human ear) combination of the vocal and or instrumental tracks from two different songs or sources of content in any combination.

Combining two different tracks into a single mashup includes matching the various properties of each audio track in one embodiment. In order to have an effective, seamless and appealing mashup, the tempo, pitch, meter and volume of each track should be matched to each other as possible. It is also important to create a compositional arc to keep the mashup interesting. The various properties can be changed in the following ways:

The tempo of a track can be changed in several ways. The most effective way is to use a time stretching process. Time stretching can stretch or compress the audio lengths in order to speed up or slow down the track's tempo without affecting the audio's pitch. Audio can also be cut phrase by phrase and relocated to make sure the vocal phrases match the correct beats in the instrumental track.

Pitch—Preferably, both tracks used in the mashup are in the same key and tuned correctly. However, a pitch shifting process allows the pitch of a recording to be changed without affecting the tracks length (keeps tempo intact). Another way to ensure that a vocal track matches a new key is to create an additional harmonization track. This can be done by copying the vocal track and changing the pitch of individual notes to harmonize with the original vocal track. This technique can be employed in certain key areas where there is tonal ambiguity.

Meter—The meters of the tracks in the mashup should match. If one track is 3/4 time and the other is in 4/4 time, the two tracks will not be in sync, and the beginning of each measure will not match up. In order to match the meter of both tracks it might be necessary to add rests and or truncate some of the vocal phrases. Typically, these steps are taken to ensure that the first beat of each measure with both tracks is aligned.

Volume—To make the mashup sound seamless you have to make sure the two tracks sit well together. To make sure they work together sonically, the volume on each track is adjusted until the relative volume on both tracks is the same. Its sometimes necessary to EQ in order to "carve" out a space for the new track.

Other—There are many other techniques used to create mashups in addition to the ones listed herein. For example, other elements can be added to the mashup to emphasize particular parts of the tracks. If the mashup needs the rhythm to be more defined, original instrumentation (drums, strings, etc.) can be added to help the track.

Vocal extractions with lots of unwanted sonic artifacts from the extraction process can be masked by doubling up and/or adding extra effects (chorus, delay, reverb, etc.)

Interest in the mashup can be generated by changing the dynamic quality of the tracks. This can be achieved by bringing in and out various elements of the mix at different times.

Then the custom of mixed content can be delivered 110 to a user. Often, the delivery of the mixed content includes receiving input from a user selecting tracks to combine from the user's perspective. As previously stated, the tracks have already been combined and the selections of the user are used to identify a specific mashup. During pre-production, in one embodiment as previously stated, the tracks are combined, while preferably maintaining tempo, pitch, volume, etc., as previously described. In some instances, the content studio 155 may include multiple versions of a track where each track is pre-processed for certain tempos, pitches, volumes, or the like or any combination thereof. This enables the same track to be included in multiple mashups. This also allows the same track to be altered as required in order to be compatible or combined with other tracks. For example, a first track can be combined with a second track to generate a first mashup by altering at least one of tempo, pitch, volume, etc. The first track can also be combined with a third track to generate a second mashup by altering at least one of the tempo, pitch, volume, etc., in a different way. Of course, it may be the second track and the third track that are modified prior to combining with the first track. Alternatively, all or some of the tracks in a particular mashup may be modified prior to combining.

The following discussion provides more details regarding the generation of a mixed content that is selected by a user. The mixed content combines tracks or portions of previously unrelated content in one embodiment to generate a new mix of content or a mashup for the user.

Figure 4A:
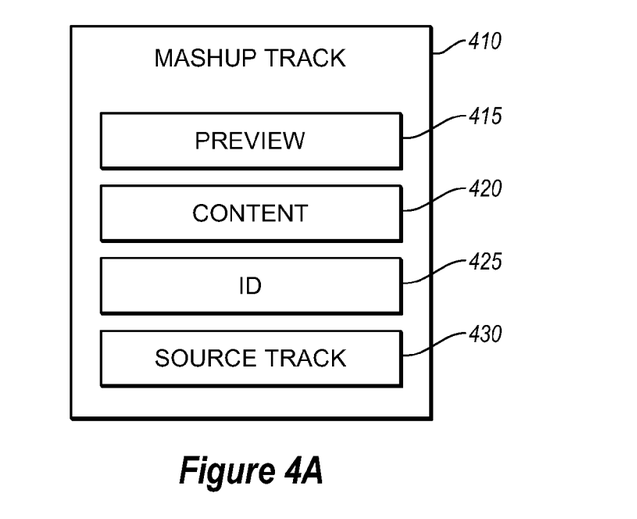
FIG. 4A illustrates a mixed ringtone and a plurality of data associated with the mixed ringtone.
Figure 4B:
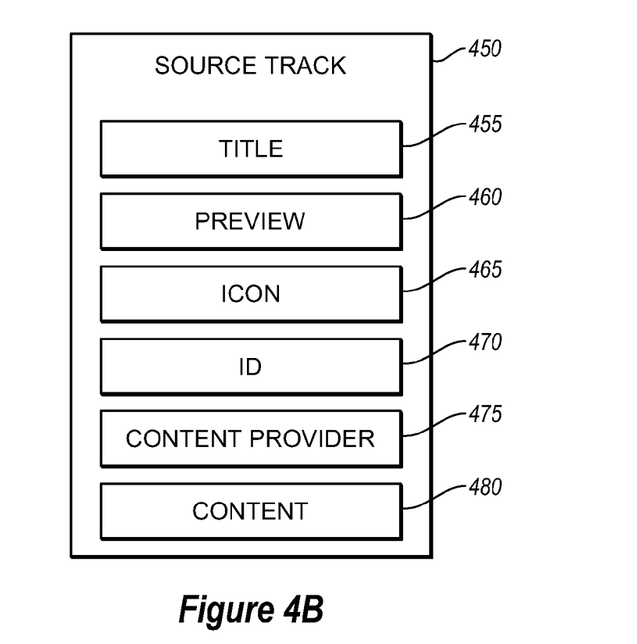
FIG. 4B illustrates a source track and a plurality of data associated with the source track.

The various tracks capable of being used as source tracks for generating a mixed ringtone are stored within the content studio 155 or are accessible to the content studio 155. As previously stated, the tracks or other content is often prepared (e.g., by separating instruments from vocals, by accounting for pitch, tempo, volume, etc.) As shown in FIGS. 4A and 4B, each track also includes or is associated with metadata that describe the various characteristics of each track. FIG. 4A, for example, illustrates an exemplary mashup track 410 or mixed track which is associated with a plurality of data, such as metadata. In this example, the mashup track 410 is associated with an identification number 425, data which identify which source tracks 430 were used to generate the mashup track 410. In this example, the mashup track 410 may include or be associated with multiple versions of the mashup track 410, one which is suitable for use as a preview 415 of the track and another version which is identified as the mashup track content 420, which is a phone-ready ringtone. In fact, the mashup track content 420 may include different formats of phone or device-ready mashups. Thus, one benefit of having two versions of the mashup track 410 is the ability to provide a user with a preview of the final ringtone so that the user may determine whether or not they would like to purchase or receive the final ringtone before finalizing their selection. Typically, the preview 415 version of the mashup track 410 will be generated at a lesser quality than the finalized phone-ready content 420.

FIG. 4B illustrates the data which may be associated with a source track 450 which may be used to generate the mashup track 410. In this example, the source track 450 is associated with a title 455, an icon 465, and an identification number 470. This information may then be used to identify the source track 450. As described more fully below, the title 455 may be a title of the song, the name of an artist, a description of the track 450 or the like. The icon 465 may be a picture of the artist, an album cover, an instrument featured in the track, or any other image or graphic. The source track is also associated with information indicating the identity of the content provider 475, which may be the name of the artist, record company, distributor, or a location of where the content 480 of the source track 450 is located. Similar to the mashup track 410 described above, the source track 450 may also be associated with a preview 460 in addition to the content 480, which a user may use to review a track selection.

As described more fully below, one embodiment of the invention may involve analyzing the source tracks 450 for compatibility in order to determine which tracks have compatible musical characteristics. In this embodiment, the source tracks 450 may also be associated with metadata or other data which describes the various characteristics of the track, including, but not limited to tempo, track type (such as drum beat, rhythm, lead, bass selection, and the like), key, genre, and length. As described more fully below with reference to FIG. 5, by analyzing these characteristics, the server 150 of one embodiment is able to construct a compatibility matrix 500 which is used to determine which source tracks may be combined into a mashup track 410. However, embodiments may allow any track to be combined with any other track and may adjust any of the track's characteristics in order to attempt to provide a best fit.

As previously mentioned, selecting and creating mixed ringtones may include associating metadata with various tracks for use in indexing and retrieving compatible tracks. Other methods may be used to associate the various properties to each track and such methods are known throughout the art of data storage and retrieval and will obvious to one in the art with the benefit of the present disclosure.

Figure 2:
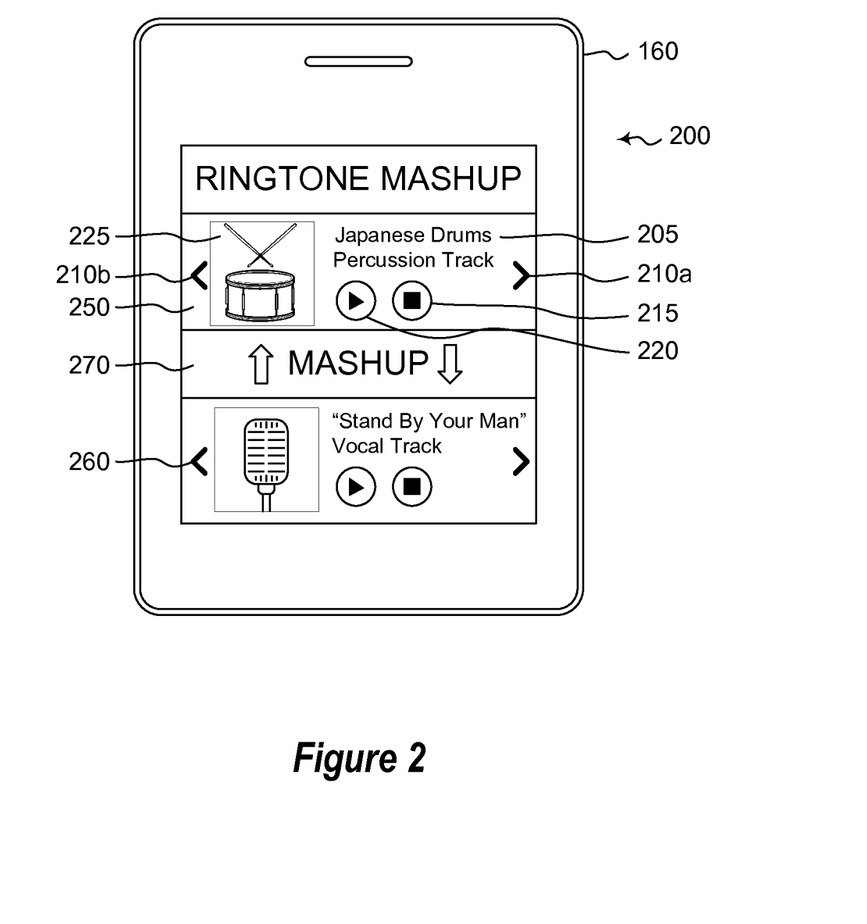
FIG. 2 illustrates an exemplary user interface which may be used in association with the invention.

FIG. 2 illustrates an exemplary user interface 200 which may be used in association with the present invention. The user interface 200 illustrated in FIG. 2 is only one example of a user interface and any number of user interfaces may be used in association with the present invention. Furthermore, any number of selection and display components which may be used in user interfaces may be used in association with the present invention. In the exemplary user interface 200 shown in FIG. 2, the user interface 200 which is displayed on the device 160 includes a first track selection portion 250 and a second track selection portion 260 together with a mashup selection button 270. The first selection track portion 250 and second selection track portion 260 are used to browse through a plurality of tracks that are available in the content studio 155 in order to identify a first track and second track which should be mixed together to generate a mashed up track.

In this embodiment, the user is able to browse through the source tracks 450 available in the content studio 155 using a series of browsing arrows 210a-210b (or other browsing mechanism such as a roller ball, finger swipe on touch displays, etc.), such that when the user selects an arrow, the next available source track in the content studio 155 is presented to the user. The track selection portions 250 and 260 each also include a play button 220 which may be used to request a preview 460 of the track currently displayed in the track selection portion 250 and a stop button 215 which terminates the playing of the preview 460. The selection portions 250 and 260 also include a field 225 where an image or icon 465 associated with the displayed track 450 may be shown. As previously discussed, the image may be any number of images associated with the track including an album cover, a photograph of the artist, graphic illustrating an instrument featured in the track, and the like. The track selection portions 250 and 260 also include a field 205 where the title 455 associated with the track may be displayed.

As described more fully below, in one embodiment of the invention, when one source track is displayed in the first track selection portion 250, the content studio 265 may limit the number of tracks which are available for selection and display in the second track selection portion 260 to a selection of tracks which the content studio 155 has determined to be compatible with the track currently displayed in the first track selection portion 250. One advantage of this method is that the user is not necessarily given the option to select a second source track which is incompatible with the first source track. Alternatively, the user interface may allow a user to select any two or more tracks in the content studio for mixing.

In addition, embodiments of the invention may only display combinations of tracks that are pre-rendered for delivery to a user. As a result, once a user makes a selection of a first track, the list of second tracks may dynamically change to reflect the pre-rendered ringtones. The list of second tracks thus corresponds to the mixed content that have been pre-rendered based on the user's selections. If the user changes his or her mind and selects a new first track, the list of second tracks may again change such that when the user selects a second track, the combination of the first and second track has already been rendered and can be delivered to the user.

In one embodiment, after the first source track is designated for selection by being displayed in the first track selection portion 250, the content studio 265 may limit the number of tracks that may be selected in the second track selection portion 260 to those source tracks which have been determined to be compatible with the first source track and/or which have already been mixed together with the first source track into a pre-rendered mashup track.

Thus, while the user is given the illusion of selecting individual source tracks for a custom ringtone, the user's ability to select source tracks may be limited to the various combinations that have already been identified as compatible and which have already been combined into a pre-rendered mashup track 410. Thus, one benefit of using this method is that the user is given the ability to make individual selections which help personalize his or her ringtone, but because the mashup tracks have been previously screened for compatibility and have already been rendered into mashup tracks, the system is able to more quickly and efficiently respond to the user's request for a mashup track. Furthermore, because the system generates the mashup tracks prior to the user's request, the mashup tracks may be reviewed, modified, and approved by a series of human editors in order to ensure that the resulting mashup tracks have a high quality.

As may be understood by the previous description, this has advantages over other systems where the user supplies or selects two source tracks which are then sent to a content studio for mixing without any of the content being pre-rendered. In those systems, the mashed ringtone is generated without any analysis of compatibility or final review of the quality of the product. Furthermore, the user must wait while the content studio mixes and generates the resulting track. Thus, the embodiments described herein is a more efficient system which produces higher quality mixed content and that can deliver a mashup track as soon as the selections are made.

When identifying tracks for compatibility, some tracks may be altered to provide enhanced compatibility. For example, the tempo may be increased, the track may be concatenated repeatedly for length, and the like or any combination thereof.

Figure 3A:
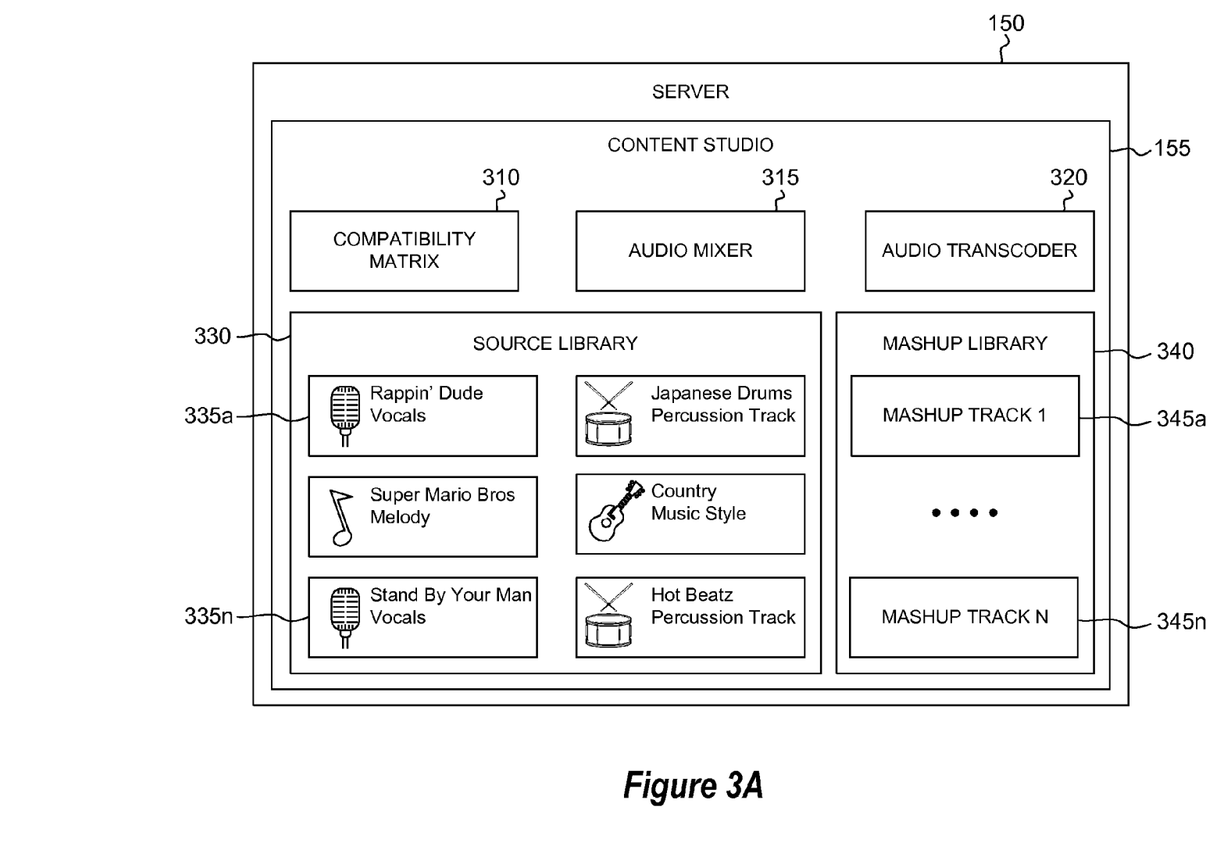
FIG. 3A illustrates an embodiment of a server that identifies and supplies a mixed ringtone or other customized content to a user according to a series of selections from the user.
Figure 3B:
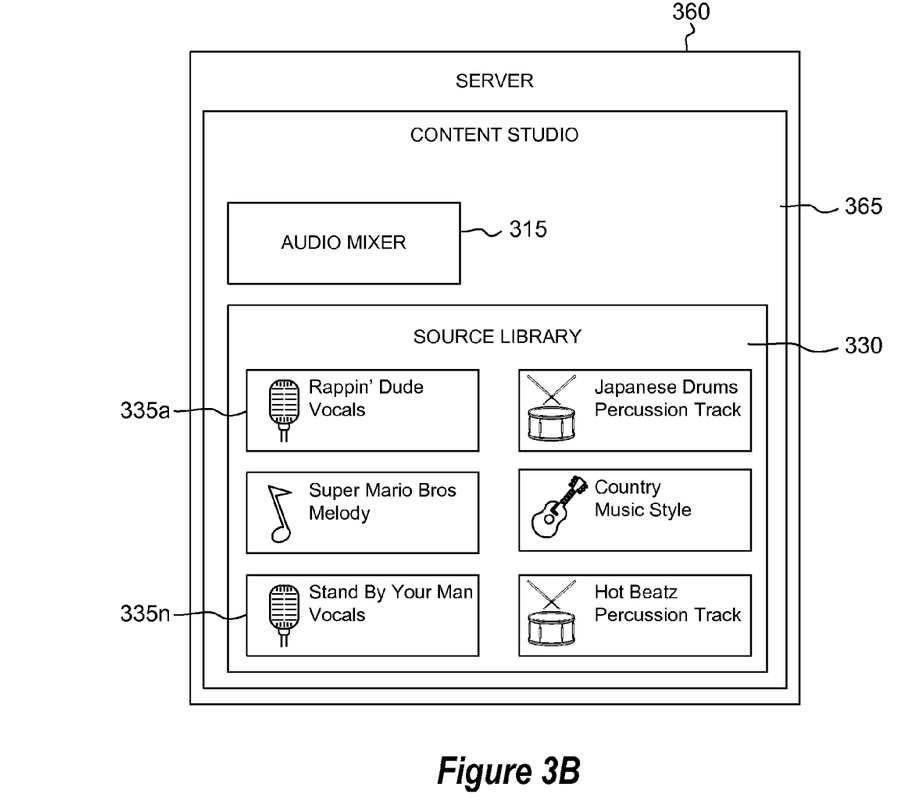
FIG. 3B illustrates an embodiment of a server including a content studio that generates the mixed ringtone or other customized content that is delivered to the user.

FIG. 3A illustrates a server 150 that generates and sends content such as a ringtone to a user. FIG. 3B illustrates a server 360 that is used to generate the mashup tracks that are delivered by the server 150. FIGS. 3A and 3B illustrate that the content studio 155 can be implemented on different servers. The mashup delivery aspect can be managed or performed by the content studio 155 while the pre-production of the mashups may be performed by the content studio 365. As previously stated, these servers 150 and 360 may be the same or different servers/group of servers.

In FIG. 3A, the server 150 includes a content studio 155 with a source library 330 that includes musical tracks 335a-335n, which, as previously described, are associated with various metadata describing each track's characteristics or properties, including for example musical properties. The source library 330 may also be used by the server 360 when generating the mashups in the mashup library 340. When the server 150 receives a request to preview a particular source track 335a, the source library 330 retrieves the preview 460 associated with the requested source track 335a, transcodes (if necessary) the preview 460 into the appropriate format for the user's device 160 and sends it to the user interface 220 on the user's device 160. Alternatively, the source track 335a may include various formats such that the delivery can time can be accelerated.

The content studio 155 may also include a compatibility matrix 310 which identifies which source tracks 335a-335n within the source library 330 are compatible with each other. One example of a compatibility matrix 310 is described more fully below. As previously described, when two source tracks 335a and 335n are identified as being compatible in the compatibility matrix 310 or altered to be compatible, a mashup track 345a has already been generated by an audio mixer 315 (which may be used by the server 360 to generate the mashup track 345a) and stored in a mashup library. In this manner, the mashup tracks 345a-345n are all pre-rendered and stored in the mashup library 340, where they can be quickly retrieved and transcoded 320 (when necessary) for delivery to the user's device 160. When multiple formats or versions of the mashups are pre-rendered, the applicable format or versions of the mashup track can be delivered to the user's device. As with the source tracks 335a-335n, the user may also request a preview of the mashup tracks 345a-345n, which may be retrieved from the mashup library 340, transcoded by the audio transcoder 320 if necessary, and sent to the user's device 160 for the user to preview before committing to a purchase or download of a final phone-ready mashup ringtone.

As previously described, the preview may be mixed and transcoded at a lower bit rate than is typically utilized in a ringtone transcoding system capable of delivering a phone-ready ringtone. Thus, more than one transcoder 320 may be used in the present invention, with one transcoder being used to transcode previews of the source tracks 335a-335n and the mashup tracks 345a-345n at a lower bit rate, and with another transcoder being used to transcode the final mashup tracks 345a-345n at the bit rate which is suitable for use in generating a phone-ready ringtone. Advantageously, this allows the server to quickly and efficiently generate a preview that assists the user in selecting his or her preferred mixed ringtone without requiring the server 150 to generate multiple high-quality ringtones.

According to one embodiment, phone-ready ringtones are delivered using a standard protocol such as WAV, MP3, or other standard protocol commonly used in the art. A user may also be provided with a link that can be selected to initiate download of the generated ringtone. Other protocols may also be used to deliver the content to the user's device, such as by email or by message.

The ability to preview source tracks 345a-345n and the mashup tracks 345a-345n enhances the user experience as the user is able to review various tracks until an appropriate selection of tracks is provided. In other words, the user is not required to wait until a phone ready mix is generated, but can listen to a lower quality preview. Additionally, the user interface may include an interface for finalizing the track selection, which may be used to initiate a purchase or other final agreement prior to generating the desired track. The final selection results in the mixing of a phone-ready version of the ringtone that is then delivered to the user's device.

In one embodiment, the relationships between tracks can be described with reference to a database or library of tracks. The compatibility of a particular track can be dependent on the metadata. For example, if the tempo and length of a particular track fit within certain parameters and therefore "match" the tempo and/or length of another track, then the two tracks may be combined into a mashup track. As previously stated, this may entail altering certain aspects of certain tracks. For example, the tempo of one track can be increased to provide compatibility with another track. Alternatively, one track may be lengthened by simply repeating the track so that the lengths of the two tracks are the same.

As previously described, the ability of a user to select tracks may be controlled by using first and second track lists (which track lists may contain the same tracks, some of the same tracks, or different tracks). Further, the tracks included in these lists may change dynamically as a user makes a selection of one track in some embodiments.

In another embodiment, a master list of tracks is stored that identifies tracks in a database or library. When a user selects a first track from a master list or from a portion of the master list, a second list of tracks (identified from the master list in one example) is then generated. The tracks included in the second list are those that are compatible with the selected first track. If the user selects a different first track, then the second list is regenerated according to the characteristics of the selected track.

In one example, the second list can be generated by comparing the metadata based on certain rules. For example, songs that have compatible tempos (i.e., the same tempo as the selected first track and/or a tempo that is within some range of the selected tracks' tempo) can be presented in the second list. If the tempos are not identical, the tempo of one of the tracks may be altered. Similarly, certain rules can also be applied according to other characteristics represented in the metadata such as pitch, key, meter. For example, compatible tracks may be limited to the same genre or to a particular list of genres. Alternatively, a track with vocals may only be compatible with a non-vocal track. One of skill in the art can appreciate, with the benefit of the present disclosure, that the rules used to identify compatible tracks or to identify the tracks that are presented in the second list once a first track is selected can vary according to at least the metadata.

The tracks that are presented in the second track may also be controlled according to a list of pre-rendered combinations or pre-rendered mashup tracks. For example, the server may engage in generating mashup tracks for a given track. This is the process of generating mashup tracks for a given track. Each mashup is a pre-rendered mashup of the given track with another track from the library. The server then stores information that describes which tracks from the library of tracks have been combined with a particular track and rendered as a mashup track. In this instance, when a first track is selected, the list of second tracks presented to a user are those that correspond to the pre-rendered mashup tracks for the selected first track.

Figure 5:
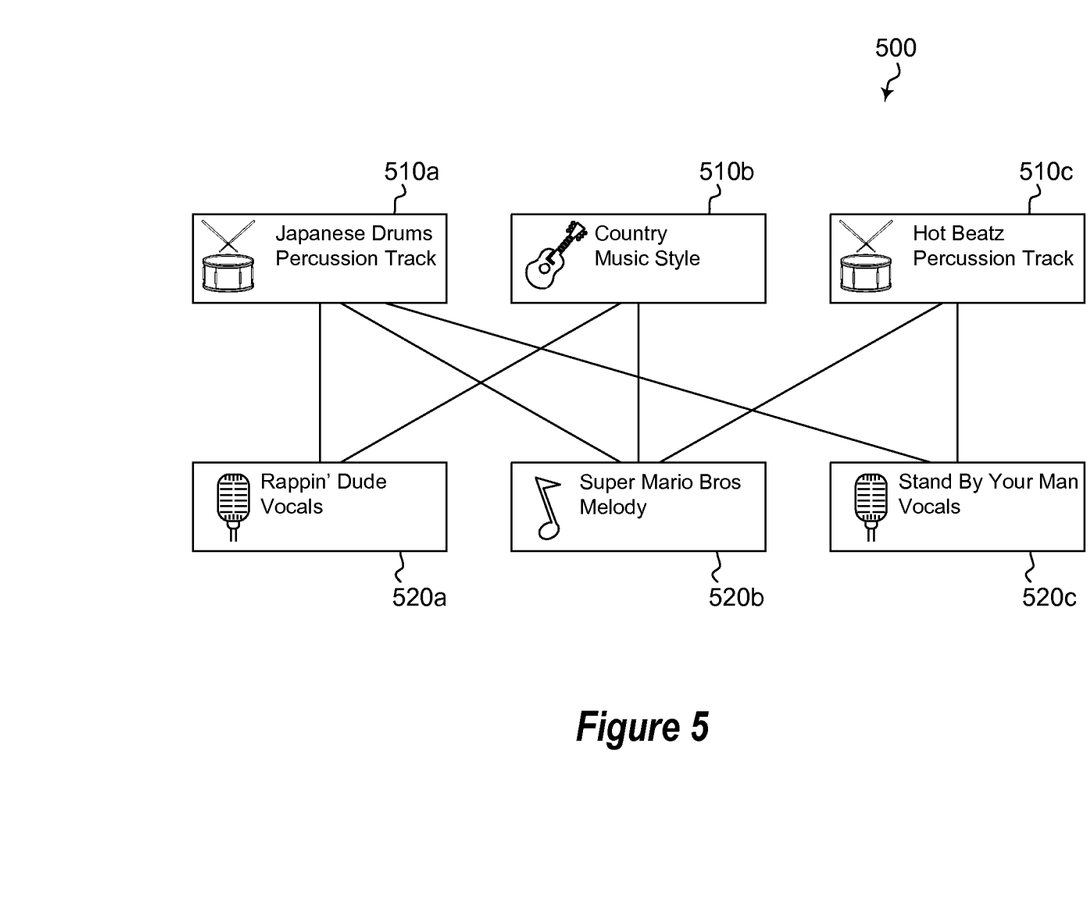
FIG. 5 illustrates an exemplary compatibility matrix which may be used in the server in one embodiment of the invention to deliver customized content.

FIG. 5 illustrates a compatibility matrix which may be used in association with embodiments of the invention. As previously described, the compatibility matrix 500 may be used to identify which source tracks 510a-510c and 520a-520c are compatible with each other and will result in an appealing final mashup track. As may be understood by one of various skill in the art, various musical characteristics may be taken into consideration when determining the compatibility of the source tracks, including the length, genre, instruments, musical range, tempo, and style of each of the tracks.

In this example, the source tracks 510a-510c and 520a-520c are divided into two groups, a first group of source tracks 510a-510c and a second group of source tracks source tracks 520a-520c. One of skill in the art can appreciate that the first group of source tracks may be the same as the second group of source tracks or may have only a partial overlap or no overlap. In one embodiment, the source tracks of the first group of source tracks 510a-510c may only be mixed with compatible source tracks in the second group of source tracks 520a-520c, and source tracks of the second group source 520a-520c may only be mixed with compatible tracks in the first group of source tracks source tracks 510a-510c. Thus, in this embodiment, the source tracks in the first group of source tracks 510a-510c cannot be combined with each other and the source tracks in the second group of source tracks 520a-520c cannot be combined with each other.

In one embodiment, the first group of source tracks 510a-510c correspond with the source tracks which the user may browse and select in the first track selection portion 250, while the second group of source tracks 520a-520c correspond with the source tracks that the user may browse and select in the second track selection portion 260. In the compatibility matrix 500 shown in FIG. 5, a line from one source track to another source track indicates that the two tracks are compatible and may be mixed together to form a mashed track. For example, the "Japanese Drums Percussion Track" 510a has been determined to be compatible with the "Rappin' Dude Vocals" 520a, the "Super Mario Bros Melody" 520b, and the "Stand By Your Man Vocals" 520c.

Thus, source track 510a has been determined to be compatible with each of the source tracks 520a-520c. As such, when a user selects the "Japanese Drums Percussion Track" 510a as the selected track in the first track selection portion 250, each of the "Rappin' Dude Vocals" 520a, the "Super Mario Bros Melody" 520b, and the "Stand By Your Man Vocals" track 520c are available for browsing and selection in the second track selection portion 260. As previously stated, a mashup track for the first selected track and each of the second tracks may have already been generated.

In contrast, the "Country Music Style" track 510b has been determined to be compatible with the "Rappin' Dude Vocals" track 520a and the "Super Mario Bros Melody" 520b, and not the "Stand by Your Man Vocals" track 520c. Because track 510b and 520c have been determined to be incompatible, when a user selects the Country Music Style" track 510b as the selected track in the first track selection portion 250, the "Rappin' Dude Vocals" 520a and the "Super Mario Bros Melody" 520b will be available for browsing and selection in the second track selection portion 260, but the "Stand By Your Man Vocals" track 520c will not be available.

In an alternative embodiment of the invention, the content studio may be stored locally on the user's device. In this embodiment, the source library and the various musical tracks stored therein may be mixed by a program or process operating locally on the user's device in response to determination that two of the musical tracks are compatible. In this embodiment, the content is pre-rendered at the user device, rather than by a content studio connected to the device via a server and network connection.

Because the source tracks that are available to the user for browsing and selection is limited to tracks that have been previously determined to be compatible which have already been rendered into mashed up tracks, embodiments of the system described herein are able to deliver mixed content to a user more quickly and efficiently than other systems currently known in the art. Furthermore, the system gives the user the ability to make track selections which result in unique combinations and customized mixed content, while ensuring that the selected tracks are compatible and suitable for generating mixed content. Thus, embodiments of the system are able to generate and deliver high quality mixed content quickly and efficiently.

The present invention extends to customized content for devices. The embodiments of the present invention may comprise a special purpose or general-purpose computer including various computer hardware.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats.

The process, methods of use and examples of components listed in the invention are illustrative and not inclusive. The invention may be embodied in other specific forms without departing from its spirit or essential characteristics. The described embodiments are to be considered in all respects only as illustrative and not restrictive. The appended claims are presented to illustrate the embodiments of the invention disclosed herein.

What is claimed is:

1. A method for providing a user with mashup tracks for a device, the method comprising:
   identifying a plurality of second source tracks compatible with a first source track based on a compatibility matrix, the compatibility matrix describing that the plurality of second source tracks includes musical characteristics compatible with the first source track;
   producing a plurality of pre-rendered mashup tracks, each pre-rendered mashup track including a combination of the first source track and a corresponding second source track from the plurality of second source tracks identified as being compatible with the first source track;
   storing the plurality of pre-rendered mashup tracks in a database;
   receiving a user request which identifies the first source track as a first track to be included in the mashup tracks for the device;
   retrieving a list of second source tracks compatible with the first source track from the plurality of second source tracks;
   providing the list of second source tracks to the user;
   receiving a user request that identifies a specific second source track as a second track to be included in the mashup tracks along with the first source track;
   retrieving a pre-rendered mashup track from the database which includes a combination of the first source track and the specific second source track requested by the user; and
   sending the pre-rendered mashup track to the device.

2. The method of claim 1, further comprising licensing the plurality of second source tracks and the first source track.

3. The method of claim 1, wherein the producing the plurality of pre-rendered mashup tracks further comprises matching one or more of a tempo, a volume, a meter, and a pitch of the plurality of second source tracks and the first source track.

4. The method of claim 3, further comprising matching a length of each of the plurality of second source tracks with the first source track.

5. The method of claim 1, further comprising dynamically updating the plurality of second source tracks when a different first source track is selected.

6. The method of claim 1, wherein the database is included in a content studio including a rights matrix configured to store rights to the first source track and the plurality of second source tracks, the rights being updatable over time.

7. The method of claim 1, further comprising providing the plurality of mashup tracks to a third party for delivery to the device, wherein the third party includes a carrier.

8. The method of claim 1, wherein at least one of the plurality of second source tracks includes one or more of vocal tracks that have been isolated from instrumental tracks and instrumental tracks.

9. The method of claim 8, wherein the vocal tracks have been isolated using one or more of phase cancellation, frequency filtering, and channel gain.

10. A method for providing a user with a mashup ringtone for a device, the method comprising:
    identifying a plurality of second music tracks compatible with a first music track based on a compatibility matrix, the compatibility matrix describing that the plurality of second music tracks includes musical characteristics compatible with the first music track;
    producing a plurality of pre-rendered mashup ringtones, each of the plurality of pre-rendered mashup ringtones including a combination of the first music track and at least one of the plurality of second music tracks identified as being compatible with the first music track;
    storing the plurality of pre-rendered mashup ringtones in a database;
    receiving a first user request that identifies the first music track as a first track of a plurality of tracks to be included in the mashup ringtone for the device;
    in response to the first user request that identifies the first music track, providing a list to the user including the plurality of second music tracks compatible with the first music track identified in the first user request;
    receiving a second user request that identifies a specific second music track from the plurality of second music tracks as a second track of the plurality of tracks to be included with the first music track in the mashup ringtone;
    retrieving a pre-rendered mashup ringtone from the database that includes a combination of the first music track identified in the first user request and the specific second music track identified in the second user request; and
    sending the pre-rendered mashup ringtone to the device.

11. The method of claim 10, wherein the producing the plurality of pre-rendered mashup ringtones further includes matching one or more of a tempo, a volume, a meter, a length, and a pitch of each of the plurality of second music tracks and the first music track.

12. The method of claim 10, further comprising:

receiving a third user request that identifies a different first music track as the first track of a second plurality of tracks to be included in a mashup ringtone for the device; and in response to the third user request, dynamically updating the plurality of second music tracks in the list.

13. The method of claim 10, further comprising:

storing rights to the first music track and the plurality of second music tracks; and updating the rights.

14. The method of claim 10, wherein at least one of the plurality of second music tracks includes a first instrumental track and a vocal track isolated from a second instrumental track.

15. The method of claim 14, further comprising isolating the vocal track from the second instrumental track using one or more of phase cancellation, frequency filtering, and channel gain.

16. The method of claim 1, wherein the compatibility matrix is created based on first metadata associated with the first source track and second metadata associated with the plurality of second source tracks.

17. The method of claim 1, wherein one of the plurality of second source tracks is altered to provide enhanced compatibility with the first source track.

18. The method of claim 17, wherein the one of the plurality of second source tracks is concatenated repeatedly to achieve a length of the first source track.

* * * * *